United States Patent
Marullo

(10) Patent No.: US 11,633,064 B2
(45) Date of Patent: Apr. 25, 2023

(54) DOUBLE-SIDED SCRAPING BLADE TOOL

(71) Applicant: Frank Salvatore Marullo, Friendsville, PA (US)

(72) Inventor: Frank Salvatore Marullo, Friendsville, PA (US)

(*) Notice: Subject to any disclaimer, the term of this patent is extended or adjusted under 35 U.S.C. 154(b) by 220 days.

(21) Appl. No.: 17/195,574

(22) Filed: Mar. 8, 2021

(65) Prior Publication Data

US 2022/0279971 A1  Sep. 8, 2022

(51) Int. Cl.
*A47J 37/07* (2006.01)
*B08B 1/00* (2006.01)

(52) U.S. Cl.
CPC ........... *A47J 37/0786* (2013.01); *B08B 1/005* (2013.01)

(58) Field of Classification Search
CPC ...... B08B 1/005; A47J 37/0786; B25G 1/102; A46B 3/18; A46B 9/02; A46D 1/0207
See application file for complete search history.

(56) References Cited

U.S. PATENT DOCUMENTS

| | | | |
|---|---|---|---|
| 8,251,423 B1* | 8/2012 | Lingle | B60R 3/00 296/1.02 |
| 10,588,458 B1* | 3/2020 | Sorenson | A47L 17/00 |
| 2009/0031519 A1* | 2/2009 | Carpenter | A47J 37/0786 15/104.001 |
| 2017/0332875 A1* | 11/2017 | Persichina | A47L 13/34 |
| 2018/0140085 A1* | 5/2018 | Mills | A46B 15/0081 |

FOREIGN PATENT DOCUMENTS

| | | | | |
|---|---|---|---|---|
| DE | 202013008981 U1 * | 5/2014 | | A47J 37/0786 |
| GB | 2041203 A * | 9/1980 | | A01B 1/12 |

* cited by examiner

*Primary Examiner* — Daniel J Colilla

(57) ABSTRACT

The invention claims a scraping tool for facilitating the effective cleaning of hot or cold grill grates utilizing a 304 stainless-steel, double-sided, elliptical-slotted blade head which is removable and replaceable. One side of the blade head having six elliptical-shaped slots cleaning the right side, top and underside right bottom of the grill grate rods and when the blade head is rotated 180 degrees to the opposite side, the six elliptical-shaped slots, cleans the left side, top and underside left bottom of the grill grate rods, effectively cleaning all six rods without having to remove the grill grate to clean the underside. The long handle/shaft has a shape and texture to safely and comfortably fit the hand while cleaning hot or cold grill grate rods.

11 Claims, 5 Drawing Sheets

DOUBLE-SIDED SCRAPING BLADE TOOL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF INVENTION

1. Field of the Invention

The subject matter of this disclosure relates to devices for safely cleaning/scraping round grill grate rods that have typically built up deposits of food, grease, sauces and oils used in cooking and related methods.

2. Description of Related Art

Grill Grids are metallic grates typically defined by an array of parallel bars or rods, known as grill grate rods. When used for cooking, a grill grate grid is usually positioned above a heat source while food is placed on the grill rods of the grill grate grid to cook. After cooking of food on the grill grate grid, ford residue, including char, remains adhered to surfaces of the grill rods. Residual food particles can cause problems if not cleaned off the grill grate rods and may cause illness or contaminate subsequent food cooking on the grill grate grid. Therefore, a need exists for a tool to simultaneously clean the top, both sides and the underside bottom of a multitude of grill grate rods quickly, effectively and with ease.

The most common tool used for cleaning the grill rods is a wire brush. However, continued use of a wire brush breaks the wires down and, in many cases, small bits of the wire cling to the grill rods and may be ingested with the next cooking of food on the grill rods.

Other tools used for cleaning grill grate rods are scraping tools. Scraping tools have not been satisfactory for cleaning grill rods because the sides and underneath bottom side of the grill rods are not cleaned without removing and turning the grill grate grid over.

Others have attempted unsuccessfully to solve the problem of the present Application and these have ranged from various styles of scraping devices to stiff-bristled brushes as follows:

U.S. Pat. No. 7,275,278 (Martin) having a handle and shaft attached to a round scraping blade with multiple sized slots and can only clean one grill grate rod at a time and cannot clean the underside bottom of the grill grate rods without having to turn the grid grate over.

U.S. Pat. No. 3,820,185 (Phillips) incorporates a blade formed of a single strip of metal, bent at one end to form the blade and incorporating two differently sized slots. This blade can only clean one grill grate rod at a time. Moreover, the short handle brings the proximity between a user's hand and the grid grate, which renders the cleaning of hot grill grate rods difficult, if at all.

U.S. Pat. No. 4,112,537 (Heuck) presents another version of a grill scraping tool that has a rotatable, circular blade having a plurality of circumferential extensions containing U-shaped indentations of varying diameters/widths. This blade can only clean one grill grate rod at a time and this blade cannot scrape clean the underneath bottom of the grill grate rods without turning the grill grate over.

U.S. Pat. No. 4,214,342 (Amundsen) illustrates a tubular handle with tubular blade extensions on either ends of the handle. Each end includes a single slot to form a cutting edge for cleaning the grill one grill rod at a time.

U.S. Pat. No. 5,479,673 (Carton) is a multi-function device including a scouring pad, a brush and a scraping blade extending from the handle, wherein the blade has a single rounded projection intermediate two transverse sections for cleaning the wires or bars of a grill grate, but only one grill grate rod at a time and cannot clean the underside bottom of the drill grate rods without turning the grill grid over and precludes the ability of cleaning the grill grid when hot.

U.S. Pat. No. 5,720,071 (Hall) includes an ergonomic handle for cleaning the grill with a back and forth motion, the handle terminating in a flat plate having a plurality of teeth attached thereto but cannot clean the underside bottom of the grill crate rods without removing the grill grate and turning it over.

U.S. Pat. No. 6,061,862 (Whitaker) includes a handle with a brush and blade scraper disposed at the distal end and a shield extending generally rearwardly of the brush, under the handle to protect the user from the flame and heat of the grill but cannot clean the underside bottom of the grill grate rods without removing the grill grate and turning it over.

U.S. Pat. No. 10,328,466 (Winter) illustrates a device utilizing small diameter pins that move independently of each other. The pins must be manually locked and unlocked which consumes time and cannot effectively clean the underside bottom of the grill grate rods without having to turn the grill grate over.

U.S. Pat. No. 10,517,459 (Rosenberger) illustrates a scraping tool with a single tooth which cleans the top and sides and an additional bent portion located on the side to clean the underside bottom. Utilizing the bent portion is unwieldly on the hand and cleaning only one rod at a time is time consuming.

U.S. Pat. No. 9,427,109 (Edwins) illustrates a prong tool that cleans one grill grate rod at a time. To clean the underside bottom, the user must twist the hand in such a manner as it makes the tool unwieldly.

U.S. Pat. No. 10,588,458 (Sorenson) illustrate a scraping tool with elongated scraping slots formed in a metal plate. To clean the top and sides, this tool is pressed down on the rods, to clean the underside bottom, this tool must be physically held up by the hand. The blade itself is hand-held and cannot be used on a hot grill for safety reasons.

SUMMARY

A grill grate rod scraping tool which facilitates the cleaning of grill grate rods, comprising of a long shaft/handle portion and a removable/replaceable blade portion having elliptical-shaped slots, six on each side of the blade. Said blade contours to the top, sides and bottom of round grill grate rods forming the grill grate. The blade portion having two scraping sides, each side having elliptical-shaped slots, one side scraping the top, right side and underside bottom right side when pushing and pulling against six grill grate rods, and when the blade is turned to the rotated side (turned 180 degrees), the blade scrapes the top, left side and underside bottom left side when pushing and pulling against the same six grill grate rods.

A grill grate rod cleaning tool is disclosed that allows to clean all sides (top, left and right sides and underside bottom) of six grill grate rods utilizing the double-sided blade that cleans the entire surface of the round grill rods efficiently, safely and with ease.

A grill grate rod cleaning tool is disclosed that allows a right or left-handed user to clean the entire top, sides and underneath bottom of the grill grate rods.

A grill grate rod cleaning tool that provides a safe way to clean not only cold grill grate rods but also while the grill grate rods are hot.

A grill grate rod cleaning tool that comprises of a handle portion, such handle being made of an injection molded FPVC material for comfort and structurally strong.

A grill grate rod cleaning tool having an approximate 16 inch shaft, including the handle, said handle made of FPVC material and said shaft portion made of tubular 304 stainless-steel for safety of cleaning hot or cold grill grate rods and strength and durability to the outside elements.

A grill grate rod cleaning tool having a rigid 304 stainless-steel blade attached to the stainless-steel shaft by a stainless-steel screw into a threaded insert made of metal and spring steel which allows for the blade to be removed and replaced if ever needed.

A gill grate rod cleaning tool having elliptical-shaped slots in the double-sided stainless-steel blade designed for optimal cleaning of all sides of grill grate rods with minimal effort without ever having to turn over a grill grate to clean the underside of the rods.

BRIEF DESCRIPTION OF THE DRAWINGS

A grill grate rod scraping tool for cleaning grill grate rods making up the surface of a cooking grill having a handle, a rigid shaft extending therefrom and a double-sided scraping blade having six elliptical-shaped slots on each side for cleaning the grill rods. The blade head, attached to the shaft with a screw, in its preferred form is removable and replaceable and comprised of laser cut, 14 gauge, 304 stainless-steel, with six elliptical slots on each side. The two sides of the grill rod scraper blade head are able to clean the grill grate rods entirely by rotating over to each side of the blade head. One side cleans the top, right side and bottom right side of the grill rods. When rotated to the other side of the grill grate rod head, it cleans the top, left side and bottom left side of the grill rods. The handle has a shape and texture to comfortably fit the hand when gripped to perform the cleaning operation requiring short back and forth strokes while bearing down on the tool and grill surface with a moderate amount of pressure. For a further understanding of the nature and advantages of the present invention, reference should be had to the following detailed description, read in conjunction with the following drawings, wherein like reference numerals denote like elements and wherein.

DETAILED DESCRIPTION

Figure 1:
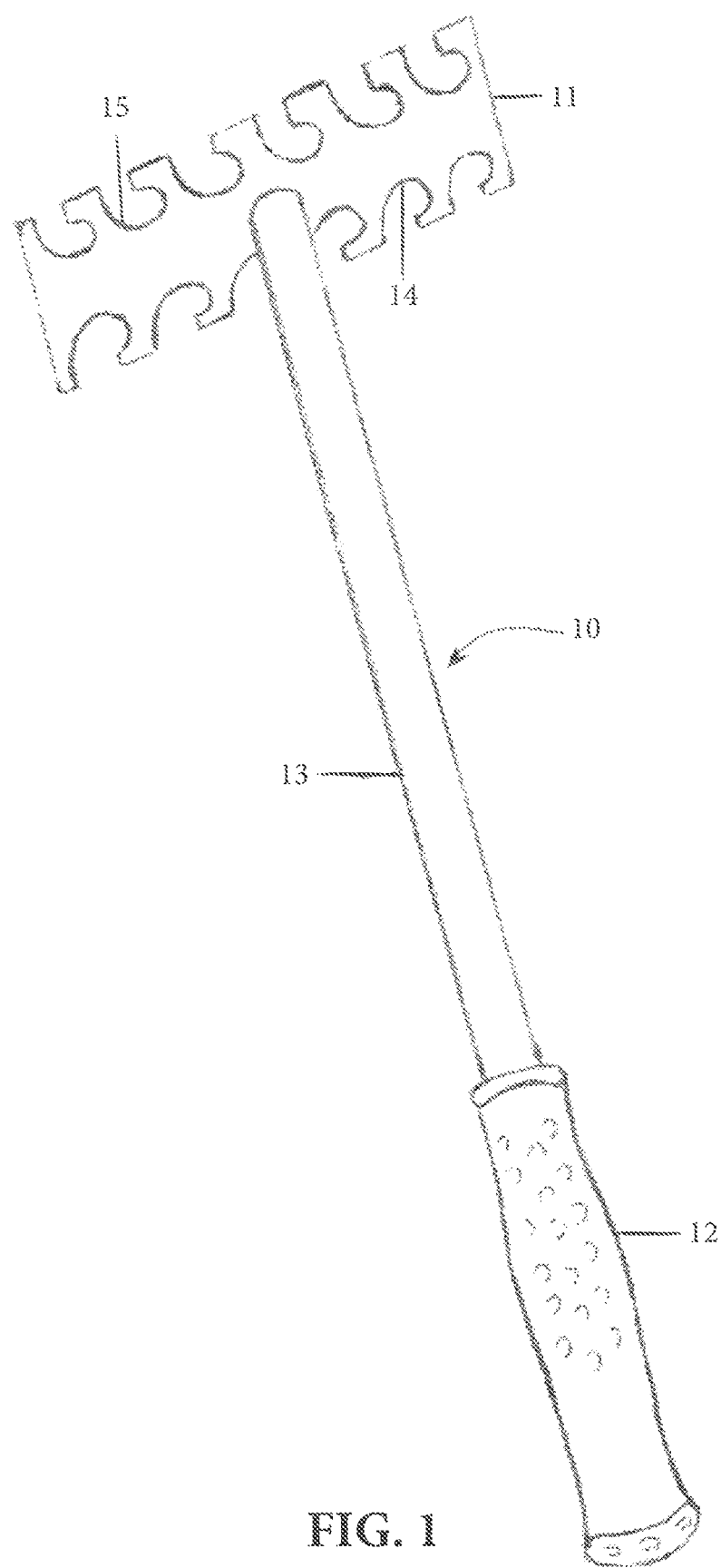
FIG. 1 is a plan view of an embodiment of the grill grate rod scraping tool of the present invention.

FIG. 1 illustrates the grill grate rod double-sided, elliptical-slotted scraping tool 10 of the present invention. Scraping Tool 10 consisting of a shaft 13 which in the preferred embodiment is composed of 304 tubular stainless-steel. In the illustrated embodiment, shaft 13 is approximately ¾ inches in diameter and approximately 16 inches long including the handle 12, which also may be of any desired length but preferably should provide a user's hand a safe distance from the surface of the grill grate rods should the grill grate rod scraping tool 10 be utilized when the grill is hot. The handle 12 is at one end of the shaft 13 and is preferably approximately 4¾ inches in length. The dimensions for Handle 12 may be varied somewhat to accommodate larger hands. Handle 12 is made of injection molded polyvinyl material and has an ergonomic, dimpled grip for comfort and is structurally strong. Handle 12 is placed over the shaft 13 and has a tight secure fit. The operating end of shaft 13 is connected to the double-sided, elliptical-slotted 14, 15 scraping blade head 11.

Figure 2:
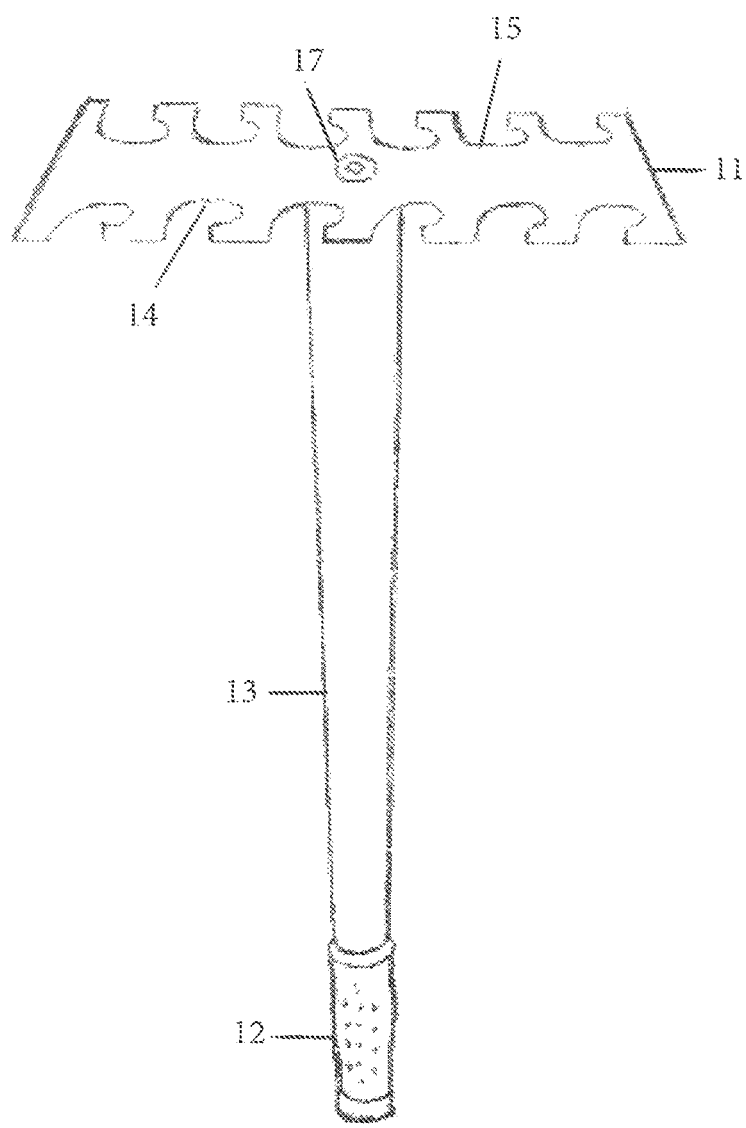
FIG. 2 is a plan view of the grill grate rod scraping tool blade head shown from the top down.

FIG. 2 illustrates a top-down view of the double-sided, elliptical-slotted grill grate rod scraping tool blade head 11 that is made of 304 stainless-steel, featuring six elliptical-shaped slots 14, 15 which facilitates the ability of the scraper blade head 11 to clean all sides (top, sides and bottom) by merely rotating the scraper tool blade head 11 to the each of the sides 14, 15. This double-sided, elliptical design enables the user to clean all sides by merely using moderate pressure on the grill grate scraper blade head 11 and pushing and pulling it back and forth, the grill grate rods are thoroughly scraped clean without ever having to remove the grill grate to clean the underside bottom. The grill grate scraper head 11 is removable and replaceable, by an internally placed screw 17 fastened to the shaft 13. The too scraping blade head 11 is composed of 304 stainless-steel with a center hole 16 to accommodate the screw 17 to secure the scraping blade head 11 to the shaft 13. In the alternative, the elliptical-slotted tool scraping blade head 11 may be comprised of brass, a softer metal for scraping grill rods made of ceramic or other coated metals. It is recognized that most higher quality grills utilize stainless-steel round rods that this grill rod elliptical-slotted scraper blade would effectively clean. Scraper blade head 11 shown fully cleans six rods, when utilizing both sides 14, 15 of the scraper head 11. This same elliptical design can be made in a multitude of sizes to fit differently sized grill grate rods.

Figure 3:
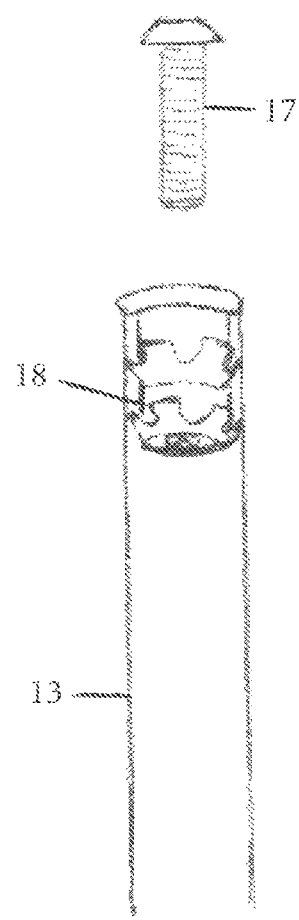
FIG. 3 is a plan view (cut-away) of the threaded insert inside the shaft and the screw that would secure the grill grate rod scraping tool blade head to the shaft by inserting the screw into the screw threaded insert.

FIG. 3 shows a cut-away of FIG. 2 of the interior of the shaft 13 showing the threaded insert 18 and the screw 17 which would attach the scraper blade head 11 to the shaft 13 by inserting the screw 17 through the center hole 16 of the double-sided blade 11 and into the screw-threaded insert 18. The threaded insert 18 is 11/16 inches long and 3/4 inches wide ensuring a tight fit into the shaft 13 and is secured to the grill grate rod scraping blade head 11 by a stainless-steel screw 17 which is 1/4"×20×3/4". The grill grate double-sided blade head 11 is attached to the shaft 13 by a screw 17 and is removable and replaceable if ever damaged, thereby removing the necessity of buying a whole new grill grate rod scraping tool 10.

Figure 4:
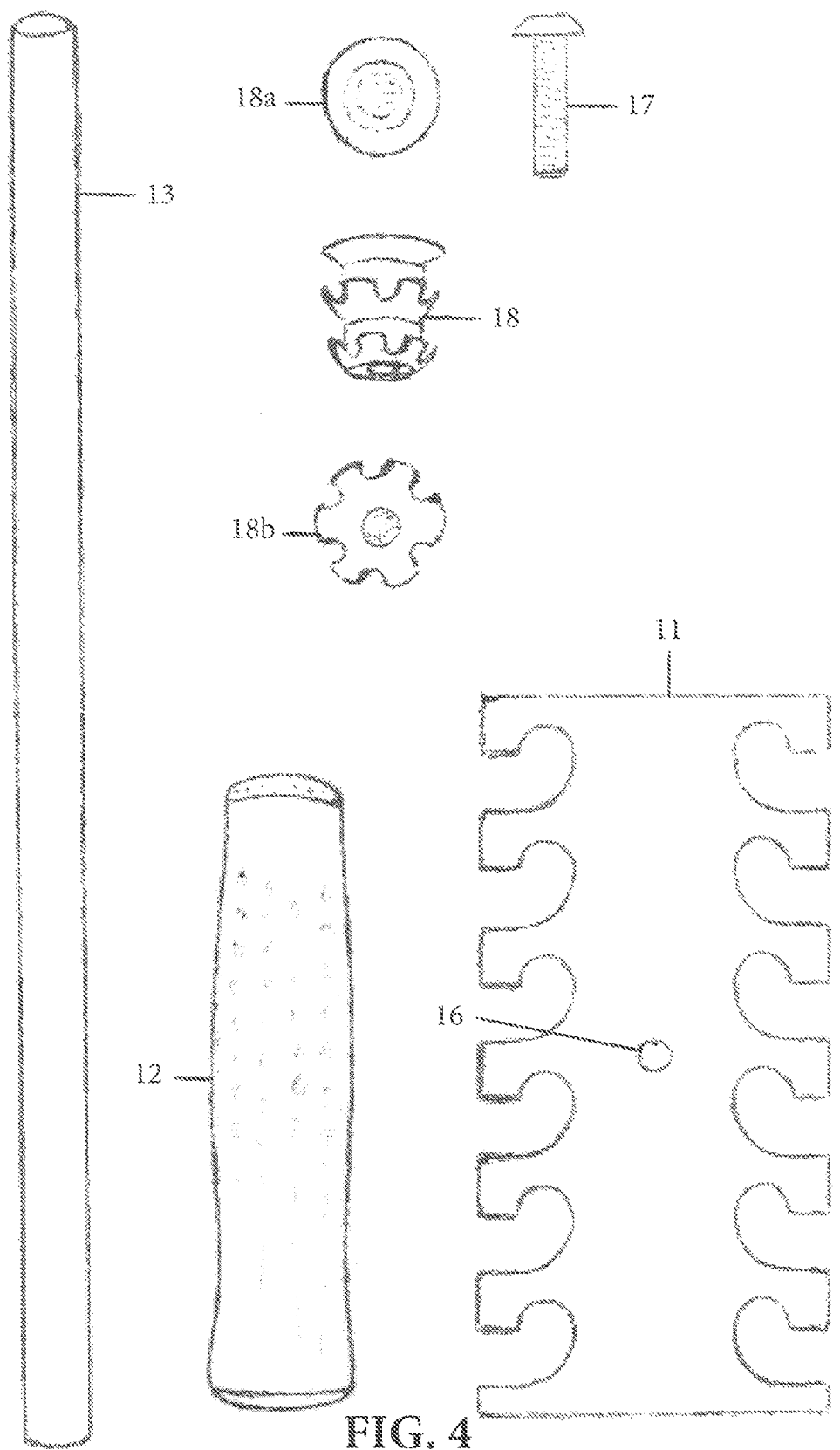
FIG. 4 is a pictorial view of the grill grate rod components consisting of a shaft, handle, threaded insert, threaded insert top down view, threaded insert bottom up view, screw and the grill rod scraper blade head featuring elliptical-shaped slots on each side of the blade and a center hole for attaching the scraper blade head to the shaft.

FIG. 4 illustrates all the components of the scraping tool comprising of the grill grate rod shaft 13, handle 12, threaded insert 18, threaded insert top down view 18a, threaded insert bottom up view 18b and a stainless-steel screw 17 which securely holds together the double-sided, elliptical-slotted grill grate rod scraper blade head 11 when the screw 17 is fastened through the center hole 16 of the double-sided scraper blade head 11 into the threaded insert 18.

Figure 5:
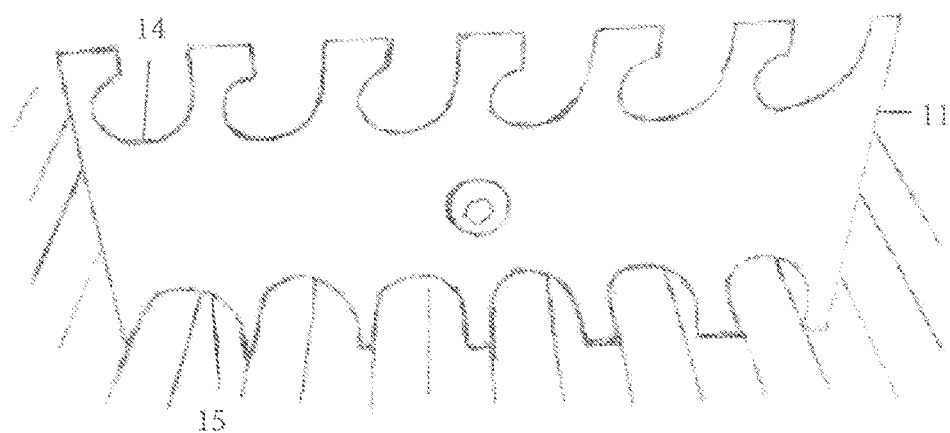
FIG. 5 is a pictorial view of the grill grate rod scraping tool blade head utilizing one side of the scraper head engaged with the metal grate rods in cleaning the top, left side and bottom left side of the grill rods.

FIG. 5 is a pictorial view of the double-sided, elliptical-slotted grill grate rod scraper head 11, utilizing the elliptical slotted design built into one side 15 of the scraper blade head 11 in use on the grill, cleaning the top, left side and bottom left side of six grill rods without having to remove the grill grate, especially useful when the grill grate is hot.

Figure 6:
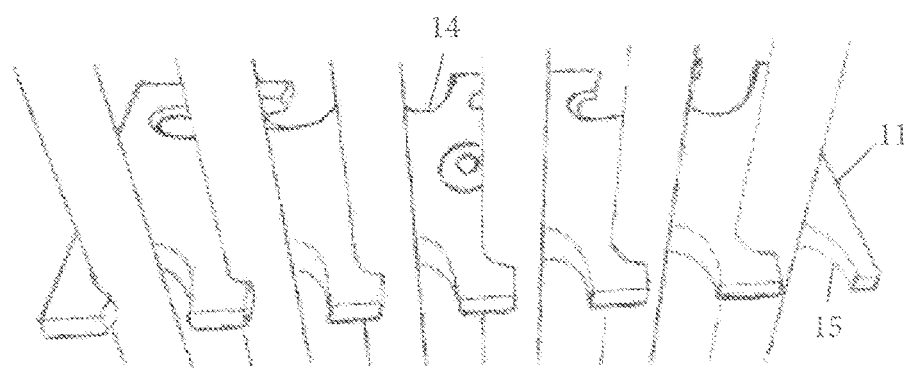
FIG. 6 is a prospective view of FIG. 5 showing how the grill grate rod scraper blade head, utilizing one side of the scraper blade head is engaged with the metal grate rods in cleaning the bottom left underside of the grill grate.

FIG. 6 is a prospective view showing the underside of what is happening in FIG. 5 of how the double-sided, elliptical-slotted grill grate rod scraper head 11, utilizing one side 15 of the scraper head 11 is cleaning the bottom left underside of the six grill rods.

Figure 7:
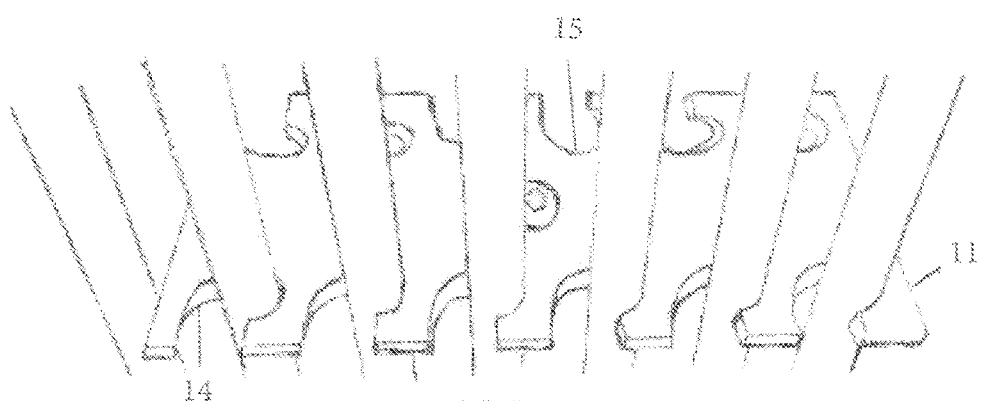
FIG. 7 is a prospective view of FIG. 8 showing how the grill grate rod scraper blade head, utilizing the rotated side is engaged with the metal grate rods in cleaning the bottom right underside of the grill grate.
Figure 8:
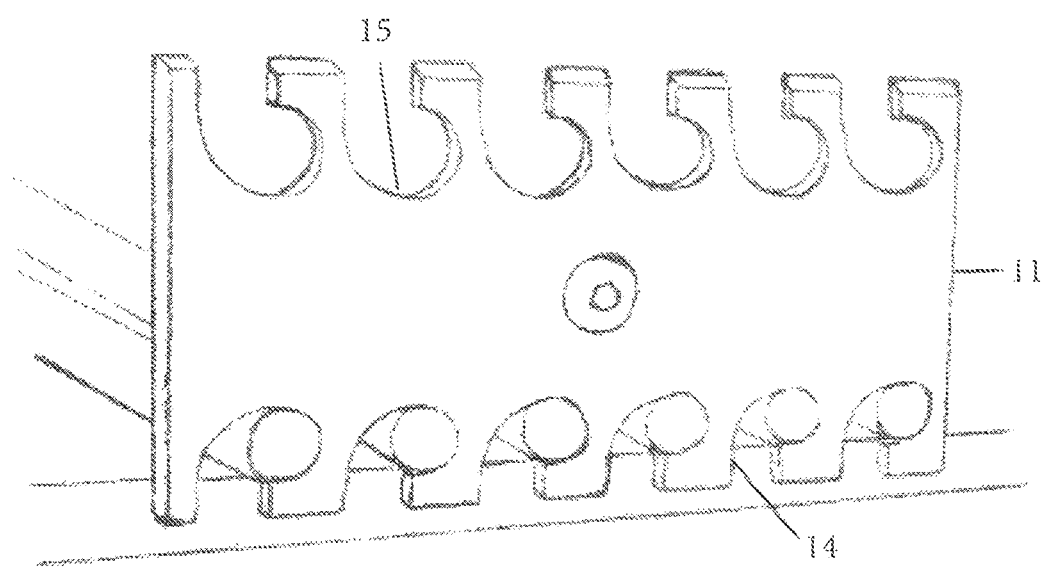
FIG. 8 is a prospective view of the grill grate rod scraper blade head, utilizing the rotated side, is engaged with the metal grate rods in cleaning the top, right side and bottom right side of the grill rods.

FIG. 7 is a prospective view showing the underside of what is happening in FIG. 8 of how the double sided, elliptical-slotted grill grate rod scraper head 11 utilizing the rotated side 14 of the scraper head 11 is cleaning the bottom right underside of the six grill rods without having to remove the grill grate, especially useful when the grill grate is hot.

FIG. 8 is a prospective view of the double-sided, elliptical-slotted grill grate rod scraper head 11 in use on the grill, utilizing the rotated side 14 of the scraper head 11 is cleaning the top, right side and bottom right underside of the six grill rods.

While a particular form of the invention has been illustrated and described, it will be apparent that various modifications can be made without departing from the spirit and scope of the invention. The invention should therefore not be limited by the above described embodiment, method, and examples, but by all embodiments and methods within the scope and spirit of the invention.

I claim:

1. A grill grate scraping blade tool comprising:
   a rectangular plate include a first edge, a second edge opposite to the first edge, a third edge, and a fourth edge opposite to the third edge;
   a handle extending from a center of the rectangular plate, said handle extending perpendicularly to said rectangular plate;
   wherein the first edge includes a first plurality of elliptically-shaped slots configured to simultaneously scrape a plurality of grill grate rods,
   wherein the second edge includes a second plurality of elliptically-shaped slots configured to simultaneously scrape a plurality of grill grate rods,
   wherein the second plurality of elliptically-shaped slots are oriented as a mirror image of the first plurality of elliptically-shaped slots along a longitudinal axis of the rectangular plate,
   wherein the first plurality of elliptically-shaped slots are configured for use in:
   a first orientation where the elliptically-shaped slots are inserted onto the grill grate rods from a position above the grill grate rods wherein each elliptically-shaped slot is configured to scrap a side portion of a circumference of respective grill grate rod and simultaneously scrape a top portion of a circumference of said respective grill grate rod while the grill grate scraping tool is in the first orientation; and
   a second orientation where the rectangular plate is rotated 180 degrees around a longitudinal axis of the handle and the first plurality of elliptically-shaped slots are inserted onto the grill grate rods from a position below the grill grate rods, wherein each elliptically-shaped slot is configured to scrape a second side portion of a circumference or a respective grill grate rod and simultaneously scrap a bottom portion of a circumference of said respective grill grate rod while the grill grate scraping tool in in the second orientation.

2. The grill grate scraping blade tool of claim 1, wherein the first plurality of elliptically-shaped slots includes six elliptically-shaped slots, and wherein the second plurality of elliptically shaped slots includes six elliptically-shaped slots.

3. The grill grate scraping blade tool of claim 1, wherein the rectangular plate is removable/replaceable by a threaded screw fastener.

4. The grill grate scraping blade tool of claim 1, wherein the rectangular plate has a thickness of 0.075 inches (approximately 5/64 inch) and is made from 14 gauge stainless-steel.

5. The grill grate scraping blade tool of claim 1, wherein the rectangular plate is made from laser cut stainless-steel.

6. The grill grate scraping blade tool of claim 1, wherein the handle is 16 inches long and is configured to allow a user to easily rotate the grill grate cleaning tool to selectively present either the first side of the rectangular plate or the second side of the rectangular plate to the grill grate rods.

7. The grill grate scraping blade tool of claim 1, further comprising a shaft made of tubular 304 stainless-steel material which is strong and weather resistant.

8. The grill grate scraping blade tool of claim 1, further comprising a long shaft configured to safely clean hot and cold grill grate rods.

9. The grill grate scraping blade tool of claim 1, wherein the handle is configured to be used by a left-handed or right-handed person.

10. The grill grate scraping blade tool of claim 1, further comprising a shaft, wherein a longitudinal axis of the shaft is aligned with a longitudinal axis of the handle.

11. The grill grate scraping blade tool of claim 1, further comprising a shaft, wherein a longitudinal axis of the shaft is coincident with a longitudinal axis of the handle.

\* \* \* \* \*